United States Patent

Dachs

[15] 3,666,776
[45] May 30, 1972

[54] DIOXABICYCLO OCTANE COMPOUNDS

[72] Inventor: Norman W. Dachs, Buffalo, N.Y.
[73] Assignee: Hooker Chemical Corporation, Niagara Falls, N.Y.
[22] Filed: Feb. 20, 1970
[21] Appl. No.: 13,235

[52] U.S. Cl. .................................260/340.9, 424/278
[51] Int. Cl. ................................................C07d 21/00
[58] Field of Search...............................260/340.9

Primary Examiner—Alex Mazel
Assistant Examiner—James H. Turnipsecol
Attorney—Peter F. Casella, Donald C. Studley, Richard P. Mueller, James F. Mudd and William J. Crossetta

[57] ABSTRACT

Compounds of the formula

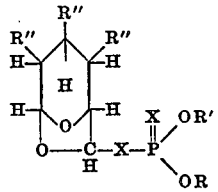

are described wherein R, R' and R'' are independently selected from the group consisting of hydrogen and lower alkyl of one to six carbon atoms and X is oxygen or sulfur.

The compounds are preferably prepared by reacting acrolein dimer with a phosphorus compound of the formula HXP(X)(OR'(OR).

The compounds are pesticidal, insectidal and acaricidal.

9 Claims, No Drawings

DIOXABICYCLO OCTANE COMPOUNDS

SUMMARY OF THE INVENTION

New dioxabicyclo octane compounds are described of the formula

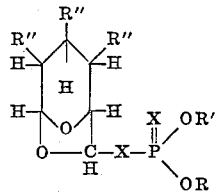

wherein R, R' and R'' are independently selected from the group consisting of hydrogen and lower alkyl of one to six carbon atoms and X is oxygen or sulfur. The acrolein dimer bulletin PD-123, Dec. 1959, of Shell Chemical Company describes the reaction between acetic acid and acrolein dimer in acidic medium at 60° centigrade to produce the compound 7-acetoxy-6,8-dioxabicyclo (3.2.1) octane.

The compounds of this invention are preferably prepared by reacting the acrolein dimer with a phosphorus compound of the formula HXP(X)(OR')(OR). In one step, the dioxabicyclo octane compound with the phosphorus group is prepared.

It is an object of the invention to produce novel dioxabicyclo octane-phosphorus containing compounds.

DESCRIPTION OF PREFERRED EMBODIMENTS

In the reaction of acrolein dimer with a phosphorus compound of the formula HXP(X) (OR') (OR) compounds of the formula

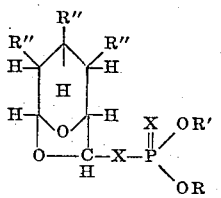

are produced wherein R, R' and R'' are independently selected from the group consisting of hydrogen and lower alkyl of one to six carbon atoms, X is equal to oxygen or sulfur. R, R' and R'' may be hydrogen or lower-alkyl such as, methyl, ethyl, butyl, propyl, isobutyl, and hexyl. The preferred HXP(X)(OR')(OR) wherein hydrogen, R and R' are lower alkyl, preferably methyl or ethyl while X is sulfur.

In the process for preparing the compounds of the invention, acrolein dimer is normally reacted with a phosphorus compound of the formula HXP (X) (OR') (OR) wherein, X, R and R' are defined above.

The temperatures employed for this reaction range from about 0 degrees centigrade to about 100 degrees centigrade, preferably from about 20 to about 80 degrees centigrade. The reaction can take place in the presence of solvents which are inert to the reactant and the reaction products. Such solvents are chlorinated aliphatics of one to four carbon atoms, such as perchloroethane, tetrachloroethane, chloroform, etc. Other solvents could be employed such as aromatic hydrocarbons as toluene, benzene, xylene etc.

Acrolein dimer is prepared by the Diels-Alder reaction with acrolein. In order to obtain in the substituents on the cyclic ring, acrolein could be substituted by various alkyl substituents. The compound used in the Diels-Alder reaction is of the formula

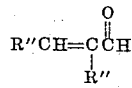

wherein R'' = hydrogen or lower alkyl of one to six carbon atoms. Among such compounds are:

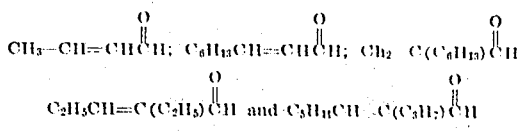

Another alternative would be to react acrolein dimer with acetic acid to prepare 7-acetoxy-6,8-dioxy-bicyclo(3.2.1) octane. The acetoxy group can be removed by normal saponification methods and the resulting material reacted with phosphorus compounds of the formula HXP(X)(OR')(OR), wherein X, R and R' are defined above.

An additional method of preparing the compounds of the invention is as follows:

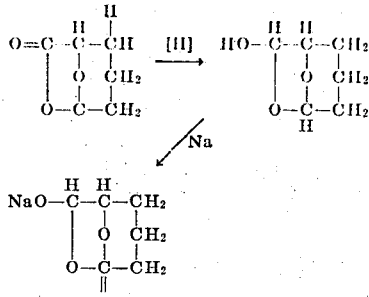

The first step would be a reduction of the keto compound to the hydroxyl and then preparing the sodium salt by treating the alcohol to sodium hydroxide. The resulting compound can them be reacted with $(Cl)_3$ P=S to produce

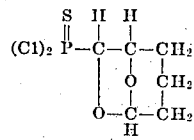

This compound can be reacted with alkanol to produce the desired diester.

While having described in general the invention, below are descriptions of preferred embodiments.

EXAMPLE 1

A solution of 56 grams (0.5 mole) of acrolein dimer and 100 milliliters of toluene was added portionwise to (0.56 mole) or 0,0-diethyl, phosphorodithioate dissolved in 150 milliliters of toluene. Addition time as 0.5 hour. An exotherm occurred having a maximum of 60° centigrade. Hydrogen chloride gas was passed into the solution until it was saturated, an exotherm occurred which peaked at 65° centigrade. The reaction mixture was heated to 80° centigrade, an exotherm occurred having a maximum of 95° centigrade. Heating was continued at 100° centigrade for 3 hours. The reaction mixture was cooled and washed with diluted sodium bicarbonate, dried over anhydrous magnesium sulfate and the organic solvent removed by heating at 95° centigrade under reduced pressure. A dark viscous liquid (130 grams) was obtained analyzing for 73 percent active component by gas chromatography. A 98 percent pure sample was obtained by chromatographic methods analyzing Cltd for P, 10.38; C, 40.30; H, 6.37
Found: P, 9.56; C, 39.35; H, 6.19

The structure was confirmed by IR and NMR and was of the formula:

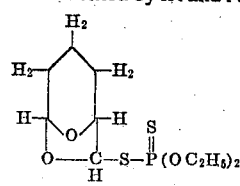

EXAMPLE 11

To 95 grams (0.5 mole) of 0,0-dimethylphosphorodithioate in toluene was added a solution of 56 grams (0.5 mole) of acrolein dimer in 100 milliliters of toluene. The addition was portionwise; an exotherm to 60° centigrade occurred. The mixture was heated at reflux for 3 hours, cooled, washed with dilute sodium bicarbonate and stripped of toluene phase as in Example 1. A viscous dark product was obtained. The structure was confirmed by IR and NMR and is listed below.

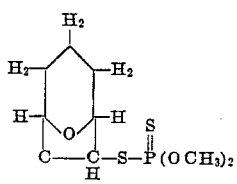

TESTING OF BIOCIDAL PROPERTIES

Field evaluation tests were carried out a potatoes, cabbage, and broccoli on a 10 by 10 foot plot. The compounds were applied at a rate of 0.5 pounds per acre having a base stock as an emulsifiable oil in aqueous dispersion. The compounded standards (employ 0.5 pounds per acre) were sprayed and the crops examined thereafter. The following testing procedures were followed:

Mite Test — Young pole lima bean plants (var. Sieva) are infested with 50 to 100 adult mites (*Tetranychus telarius L.*) on both primary leaves. After 24 hours the plants are sprayed as for the aphid test and placed in the greenhouse. After 24 or 48 hours a mortality count is made and the plants observed for 5 or 6 days to check survival. Malathion or Kelthane is used as standard miticide.

Mexican Bean Beetle — Primary leaves of lima bean plants are excised and dipped into solutions containing the chemicals. The leaves are allowed to dry by placing the petiole in water using 50 ml. flasks. After they are dry, they are transferred to paper cups inserting the petiole through a small hole at the bottom of the cup. The petiole is then kept immersed in water to prevent wilting of the treated leaf. The cup serves then as a chamber for the leaf, into which 5 larvae (fourth instar) of the Mexican bean beetle (*Epilachna varivestis Muls.*) are inserted. The cup is covered with a Petri plate top to prevent escape of the insects. Primary tests are made at 1,000 p.p.m., and the chemicals formulated as for the aphid test using 5 ml. acetone and 0.01 percent Triton X–155. Mortality of the larvae is recorded after 48 hours and percent leaf consumed by the larvae is estimated.

House Fly Test — Newly hatched adult house flies (*Musca domestica L.*) are immersed while under the action of carbon dioxide in the chemical solution to be tested. The flies are sucked into the solution in a dormant condition, shaken for a few seconds, and screened out into a paper cup containing a filter paper that has been dipped in a 10 percent sugar solution to serve as a source of food for the flies. The cups are covered with a Petri plate top to prevent escape of the flies. Ten flies are used per treatment. Data are taken on number of flies knocked down in 2 hours and killed in 24 hours. The primary test is made with concentrations of 1 percent and 0.1 percent of the chemicals formulated in acetone and 0.01 percent Triton X–155 Diazinon is used as standard insecticide.

The results are listed in Tables I and II.

TABLE I

| COMPOUND | LEAF HOPPER |
|---|---|
| | After 7 Days |
| Product of Example I | 100 |
| Guthion | 100 |
| Sevin | 0 |
| Control | 0 |

Compounds of this invention are used as the sole toxic agent in pesticidal formulations or in admixture with other toxicants for modification of the properties of the individual toxicants. They may be used, for example, in an admixture with toxaphene, DDT, Thanite, chlordane, rotenone, pyrethrum and the like.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in Aerosol formulations in which difluorodichloromethane, and similar organic solvents. The compounds of this invention are also used in Aerosol formulations in which difluorodichloromethane and similar aerosol propellants form the propellant vehicle.

Aqueous dispersions are made up from the compounds of this invention, a surface active dispersing agent and water as the essential ingredients. The amount of the compounds of this invention in the aqueous dispersions when diluted for spraying of plants will be in the range of about 10 percent to about 0.001 percent of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface active dispersing agent. The concentrate may also contain sufficient amounts of organic solvents to aid in effective dispersion. The amount of surface active dispersing agent used is usually at least 5 percent of the amount of toxic compound in the concentrate.

Suitable surface-active dispersing agents for use in the compositions of this invention are those disclosed in Chemistry of Insecticides, Fungicides and Herbicides by Donald E. H. Frear, second edition (1948), pages 280–287.

These surface active agents can be used with known insecticides and include neutral soaps of resin, alginic and fatty acids and alkali metals or alkyl amines or ammonia, saponins, gelatins, milk, soluble casein, flour and soluble proteins thereof, sulfite lye, ligment pitch, sulfite liquor, long-chain fatty alcohols averaging from 12 to 18 carbon atoms and alkali metal salts of the sulfates thereof, salts of sulfated fatty acid, salts of sulphonic acids, esters of long-chain fatty acids and poly-hydric alcohols in which alcohol groups are free, clays such as fullers earth, China clay, kaolin, attapulgite, bentonite and related hydrated aluminum silicates having the property of forming a colloidal gel. All of these composition of toxic material and surface active dispersing agents may contain an addition synergists and/or adhesive or sticking agents.

TABLE II
[Percent control]

| | Potato beetle | | | | Aphids | | | | | Mites | | | | | | | Housefly | | | | | | | |
|---|---|---|---|---|---|---|---|---|---|---|---|---|---|---|---|---|---|---|---|---|---|---|---|---|
| | | | | | | | | | | | | | | | | | After 2 hours | | | | After 24 hours | | | |
| Concentration (parts per million) | 1,000 | 500 | 250 | 16 | 16 | 8 | 4 | 2 | 1 | 05 | 1,000 | 500 | 250 | 125 | 64 | 32 | 16 | 8 | 64 | 32 | 16 | 8 | 64 | 16 | 8 | 4 | 2 |
| Compound of Example 1 | 100 | 100 | 100 | 40 | 100 | 100 | 100 | 100 | 68 | 58 | 100 | 100 | 100 | 100 | 100 | 100 | 100 | | 100 | 30 | 50 | 30 | 100 | 70 | 40 | 60 | 30 |
| Meta-Systox | 0 | 0 | 0 | 0 | 92 | 83 | 89 | 56 | 24 | 0 | 100 | 100 | 100 | 100 | 100 | 100 | 100 | 76 | 0 | 0 | 0 | | 0 | 0 | 0 | 0 |

The compounds of this invention can be used alone or with other formulation adjuvants which may be liquid or solid. The compositions are used to control pests by applying a pesticidally effective amount to the locust of the pests to be controlled. The compositions of this invention are preferably useful for the control of insects or acarids.

What is claimed is:

1. A compound of the formula

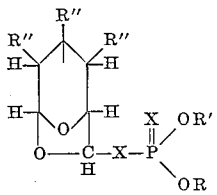

wherein X is independently selected from the group consisting of oxygen and sulfur, R, R' and R'' are independently selected from the group consisting of hydrogen and lower alkyl of one to six carbon atoms.

2. The compound of claim 1 wherein X equals sulfur.
3. The compound of claim 2 wherein R and R' are lower alkyl.
4. The compound of claim 1 wherein R' is lower alkyl.
5. The compound of claim 1 wherein R is lower alkyl.
6. The compound of claim 1 wherein R'' is hydrogen.
7. The compound of claim 1 wherein R and R' are lower alkyl, R'' is H and X is sulfur.
8. The compound of claim 3 wherein R and R' are methyl.
9. The compound of claim 3 wherein R and R' are ethyl.

* * * * *

PO-1050
(5/69)

UNITED STATES PATENT OFFICE
CERTIFICATE OF CORRECTION

Patent No. 3,666,776  Dated May 30, 1972

Inventor(s) Norman W. Dachs

It is certified that error appears in the above-identified patent and that said Letters Patent are hereby corrected as shown below:

In the Abstract, line 8, the formula "(OR'(OR)" should read ---(OR')(OR)---; line 9, "insectidal" should read ---insecticidal---. Column 1, line 51, delete "HXP(X)(OR')(OR) wherein" and insert ---embodiments are when R" is---. Column 2, line 6, "$CH_2$ C" should read ---$CH_2=C$---; line 34, delete "them" and insert ---then---; line 52, "as" should read ---was---; line 66, delete "Cltd" and insert ---Calc.---. Column 3, line 6, delete "reflex" and insert ---reflux---; line 23, "a" should read ---on---. Column 4, lines 27 and 28, delete "The compounds.....solvents"; line 63, "composition" should read ---compositions---; line 64, "an" should read ---in---.

Signed and sealed this 28th day of November 1972.

(SEAL)
Attest:

EDWARD M. FLETCHER, JR.
Attesting Officer

ROBERT GOTTSCHALK
Commissioner of Patents